United States Patent [19]
Ulm et al.

[11] Patent Number: 5,454,291
[45] Date of Patent: Oct. 3, 1995

[54] ELECTROHYDRAULIC REGULATING DEVICE HAVING PULSE WIDTH MODULATING VALVES WITH AN ADJUSTING SIGNAL

[75] Inventors: Michael Ulm, Alteglofsheim; Franz-Xaver Lacher, Tegernheim, both of Germany

[73] Assignee: Siemens Aktiengesellschaft, Munich, Germany

[21] Appl. No.: 78,543

[22] Filed: Jun. 16, 1993

[30] Foreign Application Priority Data

Jun. 16, 1992 [EP] European Pat. Off. .............. 92110167

[51] Int. Cl.$^6$ .......................... F15B 11/08; F15B 13/044
[52] U.S. Cl. ................................. 91/445; 91/459; 91/462
[58] Field of Search ................... 91/445, 459, 275, 91/361, 462

[56] References Cited

U.S. PATENT DOCUMENTS

| | | | |
|---|---|---|---|
| 3,943,824 | 3/1976 | Fletcher | 91/445 X |
| 4,120,233 | 10/1978 | Heiser et al. | 91/459 X |
| 4,136,600 | 1/1979 | Heiser | 91/445 X |
| 4,770,264 | 9/1988 | Wright et al. | |

FOREIGN PATENT DOCUMENTS

| | | |
|---|---|---|
| 0477413 | 4/1992 | European Pat. Off. . |
| 3715593 | 9/1988 | Germany . |
| 8910865 | 11/1989 | WIPO . |

*Primary Examiner*—John E. Ryznic
*Attorney, Agent, or Firm*—Herbert L. Lerner; Laurence A. Greenberg

[57] ABSTRACT

An electrohydraulic regulating device, particularly for a motor vehicle rear axle steering assembly, includes an adjusting cylinder. An electrically actuated control valve controls a hydraulic fluid flow to the adjusting cylinder. At least one electrically actuated switching valve blocks or admits a hydraulic fluid flow. A control unit generates control signals for the control valve and the switching valve. A regulating circuit supplies a pulse-width-modulated regulating signal for regulating a mean current of the control valve. A pulse-width-modulated control signal controls a mean current of the switching valve. The same supply voltage is applied to the switching valve and to the control valve. A pulse-duty factor of the control signal for the switching valve is referred to a pulse-duty factor of an adjusting signal for the control valve.

4 Claims, 3 Drawing Sheets

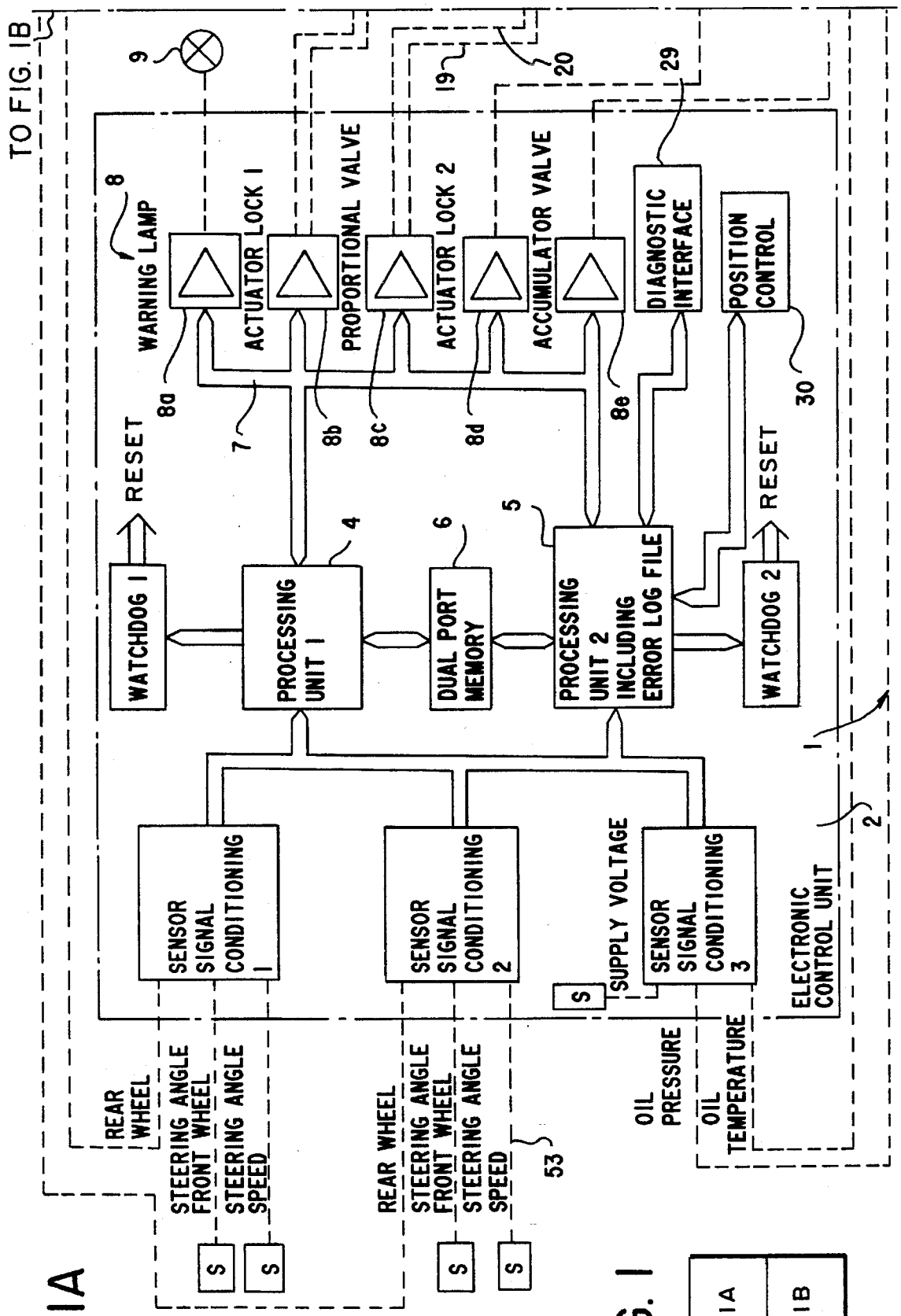
FIG.IA
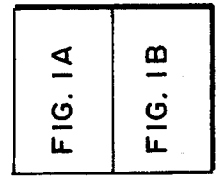

5,454,291

ELECTROHYDRAULIC REGULATING DEVICE HAVING PULSE WIDTH MODULATING VALVES WITH AN ADJUSTING SIGNAL

BACKGROUND OF THE INVENTION

Field of the Invention

The invention relates to an electrohydraulic regulating device, particularly for a motor vehicle rear axle steering assembly, having an electrically actuated control valve by which a hydraulic fluid flow to an adjusting cylinder is controlled; at least one electrically actuated switching valve by which a hydraulic fluid flow is blocked or admitted; and a control unit by which control signals for the control valve and the switching valve are generated.

Such regulating devices are, for instance, used in rear axle steering assemblies of motor vehicles, but may also be used in automatic motor vehicle transmissions, for example.

One rear axle steering assembly which is known from U.S. Pat. No. 4,770,264 includes such a regulating device, which has a hydraulic power part and an electronic signal processing part. The power part includes an electrically actuated control valve, by means of which a flow of hydraulic fluid to an adjusting cylinder is regulated, and a plurality of electric switching valves, by which the fluid flows are blocked off or admitted. The electronic signal processing part includes a microcomputer-controlled control unit, by which control signals for the control valve and for the switching valve or valves are generated. An electronic control unit having a task of setting the position of the adjusting cylinder piston with high accuracy even if interfering suspension forces at the rear axle act on the regulating system, is known from Published International Application WO 89/10865, for instance.

One example of an electrically actuated control valve is a proportional valve, which furnishes a continually varying output variable (such as a volumetric oil flow or a pressure) as a function of a continuously variable input variable (such as an electric current). The task of a switching valve is either to block off a volumetric oil flow entirely, or to admit it with the least possible pressure losses. In order to describe the electrical properties of a switching valve, a switching current and a holding current are typically defined. At least the switching current must flow in the coil of the switching magnet (which is also called a valve coil), so that an actual modulation of the hydraulic actuating elements will ensue. If the modulated state is to be held, then at least the holding current must be flowing in the valve coil.

Simple end stages for switching valves typically have only a purely yes/no function (switched/not switched). Since the supply voltage of the switching valve and the valve temperature and therefore the valve resistance directly and definitively influence the level of electric current in the valve, the valve and the associated power end stages have previously been constructed in such a way that the various switching and holding currents will still be reliably attained even at maximum operating temperature and minimum valve operating voltage. As a consequence of that construction, in all other cases (such as lower operating temperature, higher operating voltage), the current in the switching magnet coil of the valve is higher than necessary. Therefore, an unnecessary high power loss is produced in the valve, end stage and control unit.

It is accordingly an object of the invention to provide an electrohydraulic regulating device, particularly for a motor vehicle rear axle steering assembly, which overcomes the hereinafore-mentioned disadvantages of the heretofore-known devices of this general type and which lowers the power loss in electrohydraulic regulating devices.

SUMMARY OF THE INVENTION

With the foregoing and other objects in view there is provided, in accordance with the invention, an electrohydraulic regulating device, comprising an adjusting cylinder; an electrically actuated control valve for controlling a hydraulic fluid flow to the adjusting cylinder; at least one electrically actuated switching valve connected between the control valve and the adjusting cylinder for selectively blocking and admitting a hydraulic fluid flow; a control unit for generating control signals for the control valve and the switching valve; a regulating circuit in the control unit for supplying a pulse-width-modulated regulating signal for regulating a mean current of the control valve; means in the control unit for supplying a pulse-width-modulated control signal for controlling a mean current of the switching valve; means in the control unit for applying the same supply voltage to the switching valve and to the control valve; and means for referring a pulse-duty factor of the control signal for the switching valve to a pulse-duty factor of an adjusting signal for the control valve.

In accordance with another feature of the invention, there is provided a divider element receiving a pulse-duty factor being established in the regulating circuit and an applicable command current value of the regulating circuit, and a control circuit for the switching valve receiving a resultant quotient as reference information.

In accordance with a further feature of the invention, there is provided a filter element for smoothing the quotient.

In accordance with a concomitant feature of the invention, there is provided at least one other control valve, at least one other current regulating circuit, each of the control valves being regulated by a respective one of the current regulating circuits, and a quotient ascertained in a regulating circuit from a resultant pulse-duty factor and an applicable command current valve being used for an error variable imposition in at least one other of the regulating circuits.

Other features which are considered as characteristic for the invention are set forth in the appended claims.

Although the invention is illustrated and described herein as embodied in an electrohydraulic regulating device, particularly for a motor vehicle rear axle steering assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a composite showing the FIG. 1 is composed of FIGS. 1A and 1B;

FIG. 1A is a schematic and block circuit diagram of an electrical part of the regulating device according to the invention;

DESCRIPTION OF THE PREFERRED EMBODIMENT

Figure 1B:
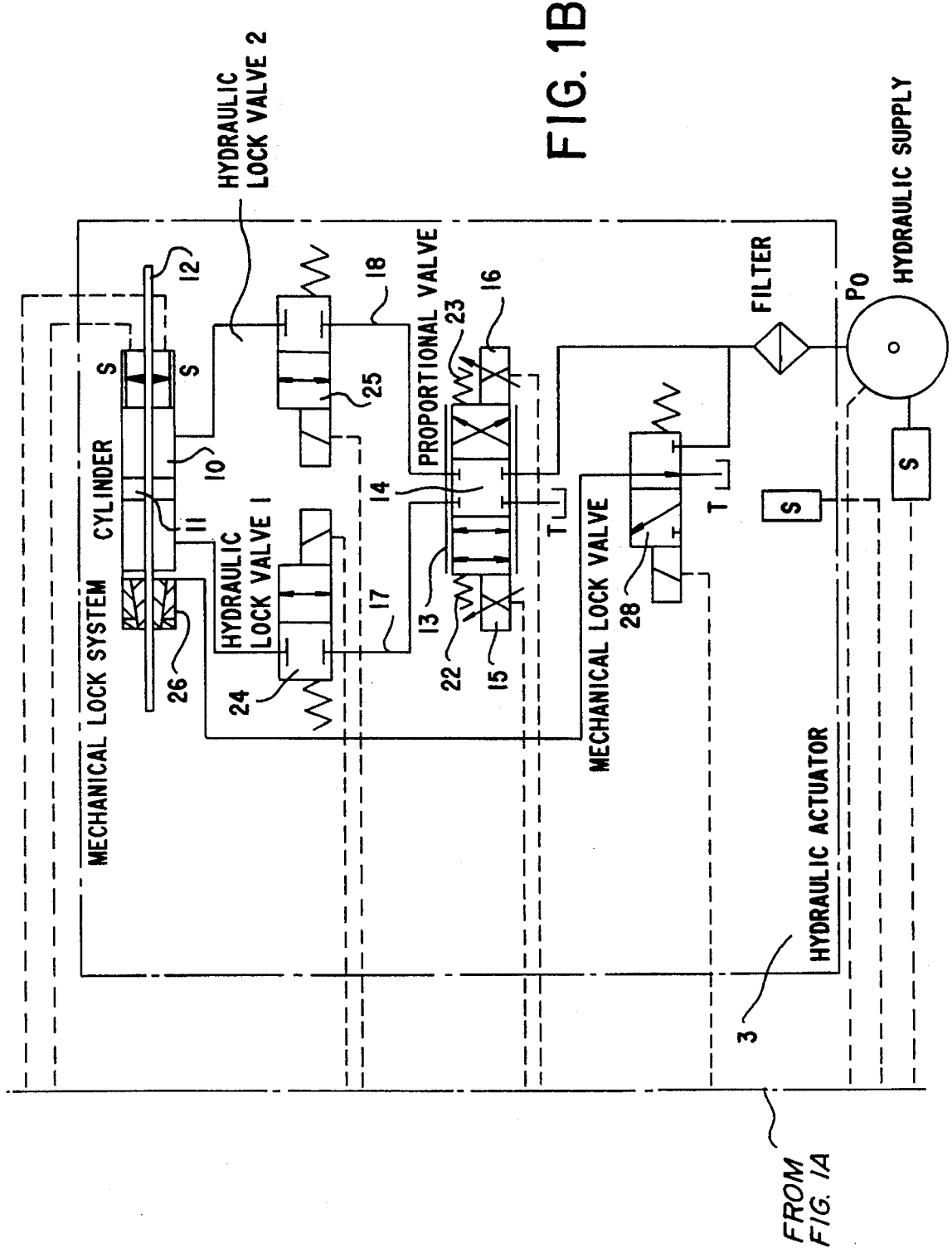
FIG. 1B is a schematic and block circuit diagram of a hydraulic part of the regulating device according to the invention.

Referring now to the figures of the drawing in detail and first, particularly, to FIG. 1 thereof, there is seen an electrohydraulic regulating device 1 for a motor vehicle rear wheel steering assembly which essentially includes, aside from non-illustrated mechanical steering assembly components, an electronic control unit 2 and an electrohydraulic power part or hydraulic actuator 3, with which the rear wheels of the non-illustrated motor vehicle are steered in this case. However, such regulating devices 1 may also be used for other regulating tasks.

The components and structure of the electronic control unit 2 can be seen from FIG. 1. It will be explained herein only to the extent necessary for comprehension of the invention. Otherwise, reference is made to Published International Application WO 89/10865 referred to above. For safety reasons, the control unit 2 includes a double computer system, with a first arithmetic or processing unit 4 and a second arithmetic or processing unit 5, which are joined to one another by a dual port memory 6. It processes the signals of a number of sensors, that are indicated by reference symbol S in the drawing, which detect the following physical variables: the front axle steering angle, the vehicle speed, the hydraulic supply pressure for the regulating device, the temperature of the hydraulic fluid (also referred to below as oil), the deflection of an adjusting piston of the electrohydraulic power part 3 as a measure of the rear axle steering angle, and the supply voltage.

The arithmetic units 4 and 5 are connected through a bus system 7 with a number of power end stages 8, by way of which control signals reach the various components of the power part 3, which are explained further below. A power end stage 8a outputs a warning signal, which in the event of a malfunction causes a warning light or lamp 9 to light up. The functions of other end stages 8b–8e will be explained in connection with the circuit components that are intended to be controlled by them.

The electrohydraulic power part 3 has a hydraulic adjusting cylinder 10, in which an adjusting piston 11, that is acted upon with pressure on both sides, is moved back and forth. This is a so-called unison cylinder, because the piston surfaces acted upon by pressure are of the same size on both sides. A piston rod 12 protruding from the adjusting cylinder 10 on both sides is connected to the rear wheel steering assembly of the motor vehicle. A 4/3 proportional multiposition valve serving as a hydraulic adjusting component, that is as a control valve 13 for the hydraulic adjusting cylinder 10, has a slide 14 which is controlled by two proportional electromagnets 15 and 16. This multiposition valve controls volumetric oil flows that flow toward or away from the adjusting cylinder 10 through hydraulic lines 17 and 18. The slide 14 of the control valve 13 may also be controlled by only a single electromagnet, in which case a spring acts on the other end of the slide.

The volumetric oil flow to the adjusting cylinder 10 and therefore the magnitude of the rear axle adjustment speed is determined by the electric current that is output by the control unit through the power end stage 8c and that flows to the electromagnets 15 and 16 over electrical lines 19, 20. Since the control valve 13 is constructed as a proportional valve, the volumetric oil flow to the adjusting cylinder 10 is adjustable continuously with the electric current in the electromagnets 15 and 16. In the currentless state, the slide 14 of the multiposition valve is pressed into its middle position, which corresponds to the zero value for the rear axle steering speed, or in other words standstill of the rear axle steering assembly, by two springs 22 and 23 acting in opposite directions relative to one another.

Particularly in the event of a malfunction, the adjusting piston 11 can be blocked, either hydraulically by two electromagnetically actuated hydraulic blocking valves 24 and 25 introduced into the lines 17 and 18, or mechanically by a brake 26 which acts on the piston rod 12 and is controlled through a likewise electromagnetically actuated hydraulic valve 28. Both the hydraulic blocking valves 24, 25 and the hydraulic valve 28 are constructed as switching valves and they are respectively controlled by the power end stages 8b and 8e.

The control unit 2 also includes a diagnostic interface 29 and a current or position regulating circuit 30 which exactly regulates the deflection of the rear wheels. These elements are only shown as blocks in FIG. 1, but reference should also be made to FIG. 2. A rear axle steering angle, which is a command or set point value for the adjusting piston position or location, is output to the current regulating circuit 30 through a position regulator by one of the arithmetic units 4, 5, in accordance with a given steering algorithm as a function of the front wheel steering angle, the vehicle speed, and optionally other parameters.

Figure 2:
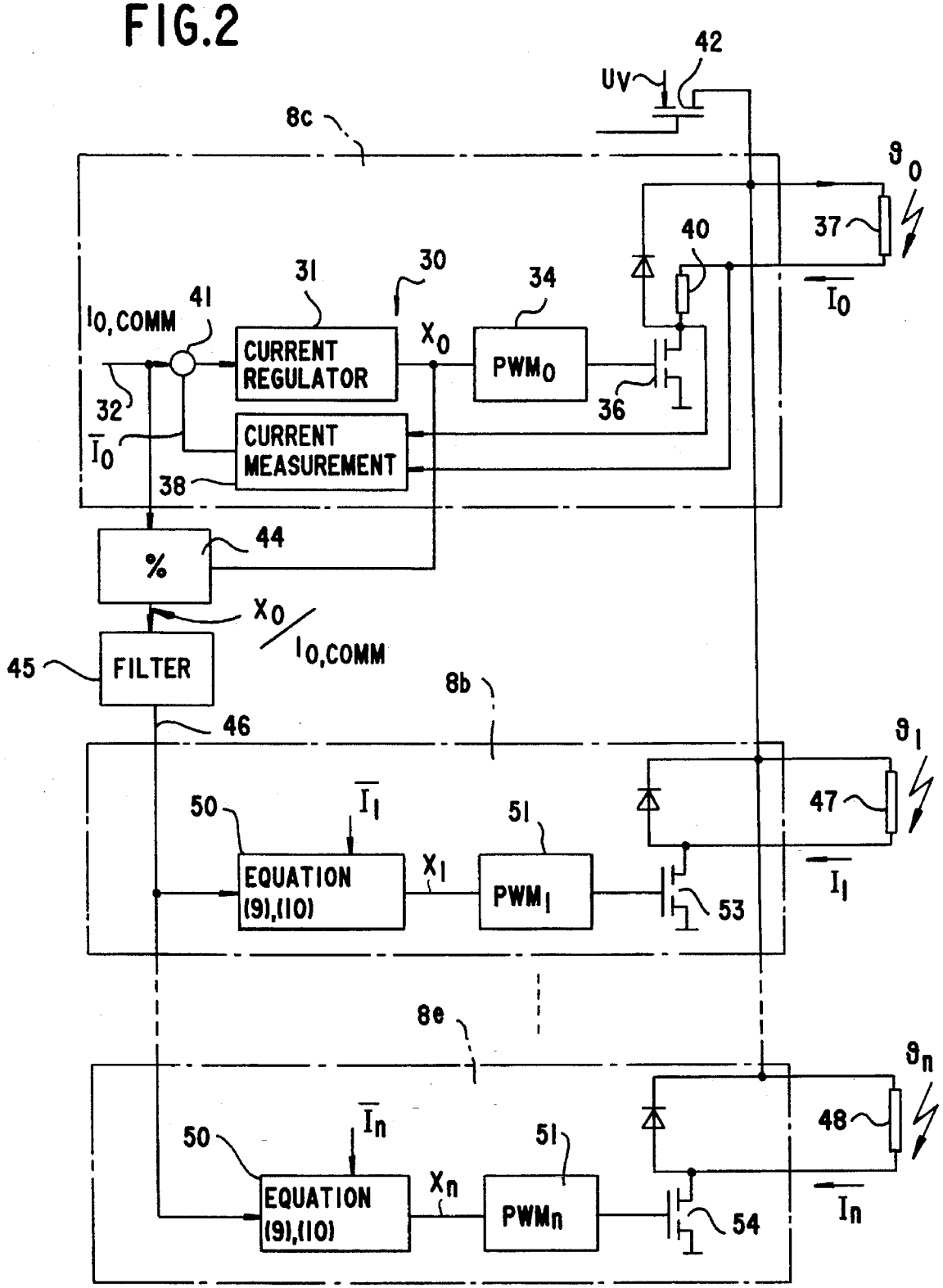
FIG. 2 is a schematic and block circuit diagram of an end stage with current regulation for a control valve, and a plurality of switching end stages for switching valves of the regulating device of FIG. 1.

The power end stage 8c shown in FIG. 2 includes the current regulating circuit 30, which is the foundation for the positional regulation for the hydraulic adjusting cylinder 10. A current regulator 31 is supplied through a line 32 with a current command value $I_{0,comm}$, which determines the speed of the adjusting piston 11.

A regulating signal $x_0$ that is output by the current regulator 31 is converted in a signal former 34 into a pulse-width modulated regulating signal, having information which is contained in the variable pulse-duty factor. It is delivered to a power switch 36, such as a field effect transistor, which controls the current through a valve coil 37 of the control valve 13 seen in FIG. 1. As a result of the ambient temperature, the power loss converted in the hydraulic power part, and the electric power loss in the valve coil, a temperature $\theta_0$ is established in the valve coil.

An electric current $I_0$ flowing through the valve coil 37 is measured by a current measuring circuit 38, specifically in the form of a voltage drop at a measuring or shunt resistor 40, which is connected in series between the valve coil 37 and the power switch 36. The mean actual current $\bar{I}_0$ is fed back from the output of the current measuring circuit 38 to the input of the current regulator 31, by being subtracted from the command current value in a subtracting circuit 41.

The valve coil 37 is connected to the supply or battery voltage $U_v$ through a redundant switch 42 provided for safety reasons.

The regulating signal $x_0$ and the mean actual current $I_0$ are divided in a divider element 44, and the result is optionally smoothed in a filter element 45. This additional smoothing is intended to compensate for the intrinsic dynamics of the current regulator circuit 30 for the ensuing processing.

Besides the power end stage 8c with current regulation, the control unit also includes one or more power end stages 8b, ..., 8e for controlling switching valves, that are also referred to below as switching end stages, which are identified in the ensuing terms by the subscript i (i=1, ..., n) in formulas and equations.

In the current regulating end stage 8c (subscript 0) the mean current in the valve coils 37 of the control valve 13 is current-regulated continuously, as mentioned. In contrast, in the power end stages 8b, ..., 8e (subscript 1 to n), the mean current in valve coils 47, 48 of the valves (such as 24, 25 and 28) to be switched is controlled, and not current-regulated, by signals furnished by the arithmetic units 4, 5. Each of the switching end stages 8b and 8e has a control circuit 50 and a pulse width modulator 51.

An output signal 46 of the filter element 45 is delivered to one input of each of the control circuits 50. A mean actual current $\bar{I}_1$ reaches another input of these circuits in the form of a signal furnished by the arithmetic unit 4 or 5. The two input signals are linked in the control circuit 50 in accordance with equations (9) or (10) that are derived as described below. The result is control signals $x_1, \ldots, x_n$, which are converted in the pulse width modulators 51 into signals with a variable pulse-duty factor, with which power switches 53 and 54 are made conducting. In accordance with the pulse-duty factor, the current then flows through the valve coils 47 or 48. Once again, temperatures $\theta_1$ and $\theta_n$ become established on the valve coils on the basis of the ambient temperature, the power loss converted in the hydraulic power part, and the electronic power loss in the valve coil.

Within the hydraulic power part 3, the various valves are closely coupled together thermally, in other words for each valve j=0, 1, ..., n, the coil temperature $\theta_j=\theta_B+\Delta\theta_j$. In this case, $\theta_B$ stands for the so-called block temperature of the hydraulic power part, and $\Delta\theta_j$ stands for the temperature difference from the block temperature inside the coil. The block temperature is determined definitively by the hydraulic losses occurring in the hydraulic circuit and by the heat dissipation capacity of the hydraulic power part. The temperature difference is determined definitively by the electric power loss in the valve and the heat conduction capacities toward the block. The requirement of thermally close coupling of the valves with one another means that the temperature rise $\Delta\theta_j$ (in the coil compared with the block) is small as compared with the possible fluctuation range of the block temperature.

An essential discovery of the invention is that the regulating signal $x_0$ regulated in the current regulation end stage 8c (or the pulse-duty factor corresponding to it) already represents a measure of the error variables in. the valve supply voltage and the valve temperature. In the switching end stages 8b, Be, in principle the same dependencies of the current $I_i$ that is established on the set pulse-duty factor $x_i$ (I=1, ..., n) fundamentally result. By relating the pulse-duty factor $x_i$ to be established in the switching end stage and having the subscript i to the pulse-duty factor $x_0$ resulting in the current regulation end stage, the aforementioned error variables cancel one another out and therefore need not be taken into account any further in control. This will become apparent from the following derivation.

The mean actual current 10 in the proportional valve 13 (subscript 0=zero) is:

$$\bar{I}_0 = c_0 \cdot x_0 \cdot u_v \cdot \frac{1}{R_0 + R_{Sh,0} \cdot R_{s,0}}, \quad (1)$$

in which:

$U_v$=supply voltage $x_0$=present pulse-duty factor $R_0$=present valve resistance $R_{Sh,\,0}$=resistance of the shunt resistor 40 (7)

$R_{S,\,0}$=resistance of the "power switch" 36

$c_O$=proportionality factor

Typically, $R_{Sh,\,0}$ and $R_S$ are low as compared with $R_0$. Therefore the following equation applies:

$$\bar{I}_0 \approx c_0 \cdot x_0 \cdot U_v \cdot \frac{1}{R_0}. \quad (2)$$

In a properly adjusted current regulator, in steady-state operation, the command value $\bar{I}_{0,comm}$ and the actual current value are approximately equal ($\bar{I}_0 \approx \bar{I}_{0,comm}$):

$$I_{0,comm} \approx c_0 \cdot x_0 \cdot \frac{U_v}{R_0}. \quad (3)$$

For the switching value i (i=1, ..., n), the following equation analogously applies for the actual current valve $\bar{I}_i$ $$\bar{I}_1 \approx c_i \cdot x_i \cdot \frac{U_v}{R_1}. \quad (4)$$

From equations (3) and (4), by division of the pulse-duty factor $x_i$ required to set the current $I_i$, the following is obtained:

$$\frac{\bar{I}_1}{I_{0,comm}} \approx \frac{c_i}{c_0} \cdot \frac{x_i}{x_0} \cdot \frac{U_v R_0}{R_1 U_v} \quad (5)$$

$$x_i \approx \frac{c_0}{c_i} \cdot \frac{R_1}{R_0} \cdot x_0 \cdot \frac{\bar{I}_1}{I_{0,comm}}$$

The valve resistances $R_j$ (j=0, 1, ..., n) are dependent on the applicable coil temperature $\theta_j$:

$$R_j = R_{j,293}°[1+\alpha_j(\theta_j-293\ K)], \quad (6)$$

in which $R_{j,\,293}$=valve resistance at 20° C.

j=coefficient of resistance, typically for copper $\rightarrow_0 = \alpha_1 = \ldots = \alpha_n = \alpha$ In accordance with the prerequisite, the coil temperature is obtained from the block temperature according to the following equation:

$$\theta_j = \theta_B + \Delta\theta_j;\ j=,\ 1, \ldots, n \quad (7)$$

If equations (7) and (6) are inserted into equation (5) and the equation is linearized with a Taylor expansion, the following is the result:

$$x_i \approx \frac{c_0}{c_i} \cdot \frac{R_{i,293}}{R_{0,293}} \cdot x_0 \cdot \frac{\bar{I}_1}{I_{0,comm}} \cdots \qquad (8)$$

$$\cdot \left( 1 + \frac{\alpha}{1 + \alpha (\theta_B - 293 K)} \Delta\theta_j - \frac{\alpha}{1 + \alpha (\theta_B - 293K)^2} \cdot \Delta\theta_0 \right)$$

$$= \frac{c_0}{c_i} \cdot \frac{R_{i,293}}{R_{0,293}} \cdot x_0 \frac{\bar{I}_1}{I_{0,comm}} \cdots \begin{array}{l} (\alpha \text{ is small}) \\ (0.004 \ldots c_n) \end{array}$$

$$\left[ 1 + \underbrace{\frac{\alpha}{1 + \alpha (\vartheta_B - 293 K)} \left( \Delta\vartheta_j - \frac{1}{1 + \alpha (\vartheta_B - 293 K)} \cdot \Delta\vartheta_0 \right)}_{(*)} \right]$$

The requirement for close thermal coupling of the valves means that $$\Delta\theta_j \ll |\theta_{B,max} - \theta_{B,min}|.$$

The term marked (*) means virtually zero!
Examples: $\Delta\theta_j = \Delta\theta_0 = 20°$ C.
For $\theta_B = -40°$ C. (*) becomes $-0.033$,
For $\theta_b = 150°$ C. (*) becomes $+0.018$.

In order to assure holding of the switching valve, a pulse-duty factor $x_{i,\,min}$ of $$x_{i,min} = \frac{c_0}{c_i} \cdot \frac{R_{i,293}}{R_{0,293}} \cdot \frac{x_0}{I_{0,comm}} \cdot \bar{I}_i \qquad (9)$$

must be provided at the switching valve driver. In order to compensate for the simplifications and component variations with respect to $R_{i,\,293}/R_{0,\,293}$ made during the derivation, a slightly higher pulse-duty factor $x_i$ will be selected:

$$x_i = (1+a) \cdot x_{i,min} \text{ or } x_i = x_{i,min} + b \qquad (10)$$

where $a > 0$, $b > 0$.

The power regulation end stage $8c$ thus furnishes reference information on the error variables in the form of the optionally smoothed quotient $x_0/I_{0,comm}$, which is transmitted with the switching end stages 1–n. As explained, this produces the minimum switching and holding currents $I_1, \ldots, I_n$, to be established, which are independent of error variables. Deviations that result in particular from changes in the battery voltage and in the valve resistances are taken into account in a reliable and economical manner.

If the electrohydraulic regulating device 1 contains not merely a single current regulation end stage $8c$ (subscript 0), but rather current regulation end stages, then the ratio of $x_0$ and $I_{0,comm}$, ascertained at the first current regulation end stage, is practically used for error variable imposition in the further current regulation end stage or stages. This has the advantage of improving dynamic performance because of the then-reduced regulator activity in the further end stages.

We claim:

1. An electrohydraulic regulating device, comprising:
   an adjusting cylinder;
   an electrically actuated control valve for controlling a hydraulic fluid flow to said adjusting cylinder;
   at least one electrically actuated switching valve connected between said control valve and said adjusting cylinder for selectively blocking and admitting a hydraulic fluid flow;
   a control unit for generating control signals for said control valve and said switching valve;
   a regulating circuit in said control unit for supplying a pulse-width-modulated regulating signal for regulating a mean current of said control valve;
   means in said control unit for supplying a pulse-width-modulated control signal for controlling a mean current of said switching valve;
   means in said control unit for applying the same supply voltage to said switching valve and to said control valve; and
   means for referring a pulse-duty factor of the control signal for said switching valve to a pulse-duty factor of an adjusting signal for said control valve.

2. The regulating device according to claim 1, including a divider element receiving the regulating signal supplied by said regulating circuit and an applicable command current value of said regulating circuit, and a control circuit for said switching valve receiving a resultant quotient as reference information.

3. The regulating device according to claim 2, including a filter element for smoothing the quotient.

4. The regulating device according to claim 1, including at least one other switching valve, at least one other current regulating circuit, and end stages controlling said switching valves, and a quotient ascertained in a regulating circuit from a resultant pulse-duty factor and an applicable command current value being used for an error variable imposition in at least one of said end stages controlling said switching valves.

* * * * *